(12) United States Patent
Agarwal et al.

(10) Patent No.: US 12,470,209 B2
(45) Date of Patent: Nov. 11, 2025

(54) CLOCK-SPEED CONTROL CIRCUIT AND METHODS FOR A DYNAMIC COMPARATOR

(71) Applicant: Samsung Electronics Co., Ltd., Suwon-si (KR)

(72) Inventors: Mukul Agarwal, Bengaluru (IN); Subodh Prakash Taigor, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/502,502

(22) Filed: Nov. 6, 2023

(65) Prior Publication Data

US 2024/0322807 A1    Sep. 26, 2024

(30) Foreign Application Priority Data

Mar. 24, 2023 (IN) .............................. 202341021250

(51) Int. Cl.
*H03K 5/24* (2006.01)
*H03K 5/00* (2006.01)
*H03K 19/20* (2006.01)

(52) U.S. Cl.
CPC ......... *H03K 5/249* (2013.01); *H03K 5/00006* (2013.01); *H03K 19/20* (2013.01)

(58) Field of Classification Search
CPC .... H03K 5/249; H03K 5/00006; H03K 19/20; G06F 13/28; G06F 12/0246; G06F 2212/7201; G06F 1/324; G06F 1/3296; G06F 3/0688; G06F 1/3275; G06F 1/3287; G06F 3/061; G06F 3/0643; G06F 3/0658; G06F 3/0679; G06F 1/3293; G06F 15/7807; G06F 2212/7203; G06F 2212/7208; G06F 1/10; G06F 1/3243; G06F 11/22; G06F 11/26; G06F 11/273; G06F 1/08; G06F 13/1673; G06F 11/1048; G06F 11/1072; G06F 12/1081; G06F 13/4022; G06F 13/404; G06F 13/4059; G06F 13/4282; G06F 2212/1016; G06F 2213/3812; G06F 2213/3854; G06F 1/04; G06F 12/08; G06F 12/0868; G06F 13/1689; G06F 13/4243; G06F 21/725; G06F 21/74; G06F 21/76;

(Continued)

(56) References Cited

U.S. PATENT DOCUMENTS 6,255,979 B1 * 7/2001 Allee .................. H03M 1/1061
                                                            341/155
8,334,717 B2 * 12/2012 Chen ...................... H03K 5/249
                                                            327/63

(Continued)

FOREIGN PATENT DOCUMENTS

CN        108494406 B        9/2018

*Primary Examiner* — John W Poos
(74) *Attorney, Agent, or Firm* — Muir Patent Law, PLLC

(57) ABSTRACT

A method to control a clock speed of a dynamic comparator may include sensing, by a clock speed control circuit, an output of the dynamic comparator to determine at least one failure in the dynamic comparator. Thereafter, the method may include reducing, by the clock speed control circuit, a frequency of a clock signal used to control the clock speed of the dynamic comparator, based on the determined at least one failure in the dynamic comparator.

16 Claims, 9 Drawing Sheets

(58) Field of Classification Search
CPC ..... G06F 2212/1032; G06F 2212/1036; G06F 2212/225; G06F 2212/262; G06F 2212/283; G06F 2212/284; G06F 2212/312; G06F 2212/313; G06F 3/0625; G06F 3/0634; G06F 3/0653; G06F 3/0659; G06F 3/0673; G06F 3/0683; G06F 3/14; G06F 12/06; G06F 13/4068; G06F 13/4221; G06F 3/0346; G06F 7/588; G06F 1/022; G06F 1/206; G06F 1/32; G06F 1/3203; G06F 1/3206; G06F 12/0864; G06F 12/0879; G06F 15/17312; G06F 15/17318; G06F 15/17325; G06F 15/17362; G06F 15/17368; G06F 15/17375; G06F 15/17381; G06F 15/17387; G06F 15/7871; G06F 15/82; G06F 21/602; G06F 2212/1028; G06F 3/011; G06F 30/00; G06F 7/49921; G06F 8/312; G06F 9/30047; G06F 9/30087; G06F 9/3802; G06F 9/3814; G06F 9/3834; G06F 9/3836; G06F 9/384; G06F 9/3869; G06F 9/3885; G06F 9/44589; G06F 9/45504; H02M 1/0009; H02M 3/18; H02M 1/0025; H02M 1/08; H02M 1/0032; H02M 3/07; H02M 1/32; H02M 3/156; H02M 3/1588; H02M 3/157; H02M 3/33507; H02M 1/36; H02M 1/38; H02M 3/073; H02M 3/33515; H02M 3/33523; H02M 1/0012; H02M 1/0048; H02M 3/1584; H02M 1/0003; H02M 1/14; H02M 1/088; H02M 3/1582; H02M 3/072; H02M 3/1563; H02M 1/0041; H02M 1/44; H02M 1/0035; H02M 1/15; H02M 3/077; H02M 3/155; H02M 3/1566; H02M 1/10; H02M 3/075; H02M 1/0095; H02M 1/083; H02M 3/01; H02M 3/04; H02M 3/071; H02M 1/0054; H02M 1/42; H02M 1/4208; H02M 3/335; H02M 3/33571; H02M 3/33592; H02M 1/0022; H02M 1/143; H02M 1/325; H02M 1/4225; H02M 3/3376; H02M 1/00; H02M 1/0019; H02M 1/0038; H02M 1/0045; H02M 1/0058; H02M 1/007; H02M 1/009; H02M 7/04; H02M 7/217; H02M 1/0016; H02M 1/0083; H02M 1/0845; H02M 1/4258; H02M 3/137; H02M 3/1586; H02M 3/28; H02M 3/33546; H02M 3/3381; H02M 3/3385; H02M 1/0006; H02M 1/0064; H02M 1/008; H02M 1/02; H02M 1/082; H02M 1/34; H02M 1/342; H02M 1/4216; H02M 3/00; H02M 3/06; H02M 3/24; H02M 3/3353; H02M 3/33561; H02M 3/33569; H02M 3/33573; H02M 3/33576; H02M 5/00; H02M 5/458; H02M 7/06; H02M 7/162; H02M 7/1626; H02M 7/445; H02M 7/48; H02M 7/4815; H02M 7/525; H02M 7/53806; H02M 7/5387

See application file for complete search history.

(56) References Cited

U.S. PATENT DOCUMENTS

| | | | | |
|---|---|---|---|---|
| 8,362,934 | B2 | 1/2013 | Matsuzawa et al. | |
| 8,542,046 | B2 * | 9/2013 | Roytman | H03M 1/004 |
| | | | | 327/108 |
| 2012/0274299 | A1 * | 11/2012 | Chang | H02M 1/32 |
| | | | | 323/283 |
| 2016/0049871 | A1 * | 2/2016 | Ihs | H02M 1/32 |
| | | | | 323/271 |
| 2021/0175880 | A1 * | 6/2021 | Wang | H03K 5/24 |

* cited by examiner

CLOCK-SPEED CONTROL CIRCUIT AND METHODS FOR A DYNAMIC COMPARATOR

CROSS-REFERENCE TO RELATED APPLICATION(S)

This application claims priority to Indian Provisional Application No. 202341021250, filed on Mar. 24, 2023, and to Indian Patent Application No. 202314021250, filed on Jul. 23, 2023, both filed in the Indian Patent Office, and the entire contents of each of which are incorporated by reference herein.

TECHNICAL FIELD

Embodiments disclosed herein relate to dynamic comparators, and more particularly to adaptively controlling a clock speed of a dynamic comparator.

BACKGROUND

Some applications require comparator outputs at certain instances instead of a continuous output. When strobing a comparator at certain intervals, higher accuracy and lower power can be achieved with a latch-based comparator. An example of a latch based comparator is a dynamic comparator. Dynamic comparators are important components in high-performance analog circuits such as high-speed analog-to-digital converters (ADCs). Dynamic comparators have high input impedance, rail to rail swing, and almost zero static power consumption (as compared to static comparators). Dynamic comparators can also be widely used in industrial applications.

Dynamic comparators can be driven at high clock speeds and can be used in charge-pump circuits to substantially reduce output voltage ripples. However, dynamic comparators are susceptible to failures when they are driven at high clock speeds. Further, the clock speeds of dynamic comparators may vary due to variations in Process Voltage and Temperature (PVT). The clock speed variation may cause failures in the dynamic comparators.

FIG. 1A depicts a clock based dynamic comparator 100. The dynamic comparator 100 works in two phases i.e., a pre-charging phase and a comparison phase. In the pre-charging phase, when the clock signal is LOW, outputs at nodes OUT1 and OUT2 are charged to $V_{dd}$ (voltage at drain). In the comparison phase, when the clock signal is HIGH, OUT1 and OUT2 start discharging.

If $V_{fb}$ (feedback voltage) is higher than $V_{ref}$ (reference voltage), then the OUT1 discharges faster than the OUT2. When OUT1 reaches Vdd-$V_{th}$, then a latch constituted by P-channel metal oxide semiconductor (PMOS) transistors P2 and P3 discharges at OUT1 and charges at OUT2 node by a positive feedback mechanism. Such a comparator may have a delay (2-3 ns) in the feedback system, due to regenerative action.

FIG. 1B depicts waveforms corresponding to operation of the dynamic comparator 100. As depicted, the OUT1 and OUT2 can be pre-charged when the clock CLK goes HIGH. If the OUT1 and OUT2 are latched on a positive CLK level (CLK=HIGH) before they get pre-charged, then the states of the OUT1 and OUT2 nodes can be saved until the next comparison is done (CLK=LOW).

For example, FIG. 1C depicts example waveforms of the dynamic comparator 100 operating in a scenario where the dynamic comparator 100 works without failure in the comparison phase. The waveforms are depicted with a CLK signal, and two output signals, OUT1 and OUT2. In this scenario, when the comparator is working, only one of the outputs i.e., OUT1 or OUT2 may toggle. For example, FIG. 1D depicts waveforms of operation of the dynamic comparator 100 in a scenario where the dynamic comparator 100 fails in the comparison phase. The dynamic comparator 100 output nodes are pre-charged to a specific value before the comparison happens. If the dynamic comparator 100 is not fast enough to make a valid comparison, then the output nodes may remain at their pre-charged values. In this scenario, when failure occurs, neither the OUT1 nor the OUT2 toggles until the end of the comparison phase.

Therefore, dynamic comparators are susceptible to failures at high clock speeds.

SUMMARY

Embodiments herein disclose a clock speed control circuit and methods for a dynamic comparator to adaptively control the clock speed fed to the dynamic comparator to avoid failures at high clock speeds. In some embodiments, a clock speed control circuit can be integrated with the dynamic comparators of existing systems to control clock speeds during operation of the dynamic comparator. Some embodiments include, a clock speed control circuit and methods for determining failure in the output of the dynamic comparator and accordingly controlling the clock speeds given to the dynamic comparator. Some embodiments include a clock speed control circuit with a control logic which can determine whether the dynamic comparator is operating fast enough or not and detect the failure.

Accordingly, some embodiments herein provide a method to control a clock speed of a dynamic comparator. The method may include sensing, by a clock speed control circuit, an output of the dynamic comparator to determine at least one failure in the dynamic comparator. Thereafter, the method may include reducing, by the clock speed control circuit, a frequency of a clock signal used to control the clock speed of the dynamic comparator, based on the determined at least one failure in the dynamic comparator.

Accordingly, embodiments herein provide a clock speed control circuit for a dynamic comparator. The clock speed control circuit may comprise an AND gate and a Finite State Machine (FSM). The AND gate is configured for sensing an output of the dynamic comparator for determining at least one failure in the dynamic comparator. The FSM is configured for generating at least one control signal for controlling a clock speed of the dynamic comparator, based on the determined failure in the dynamic comparator.

In addition, embodiments herein provide a method of controlling a clock speed of a dynamic comparator. The method includes receiving, by a clock speed control circuit, an output of the dynamic comparator to determine a failure in the dynamic comparator, and changing, by the clock speed control circuit, a frequency of a clock signal used to control the dynamic comparator, based on the determined failure in the dynamic comparator.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
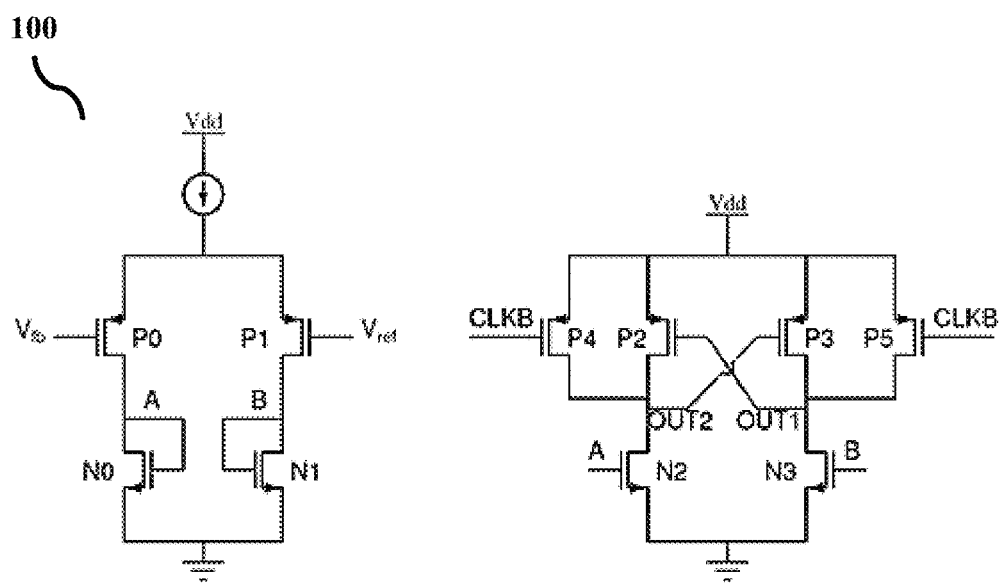
FIG. 1A depicts a conventional clock based dynamic comparator 100.
Figure 1B:
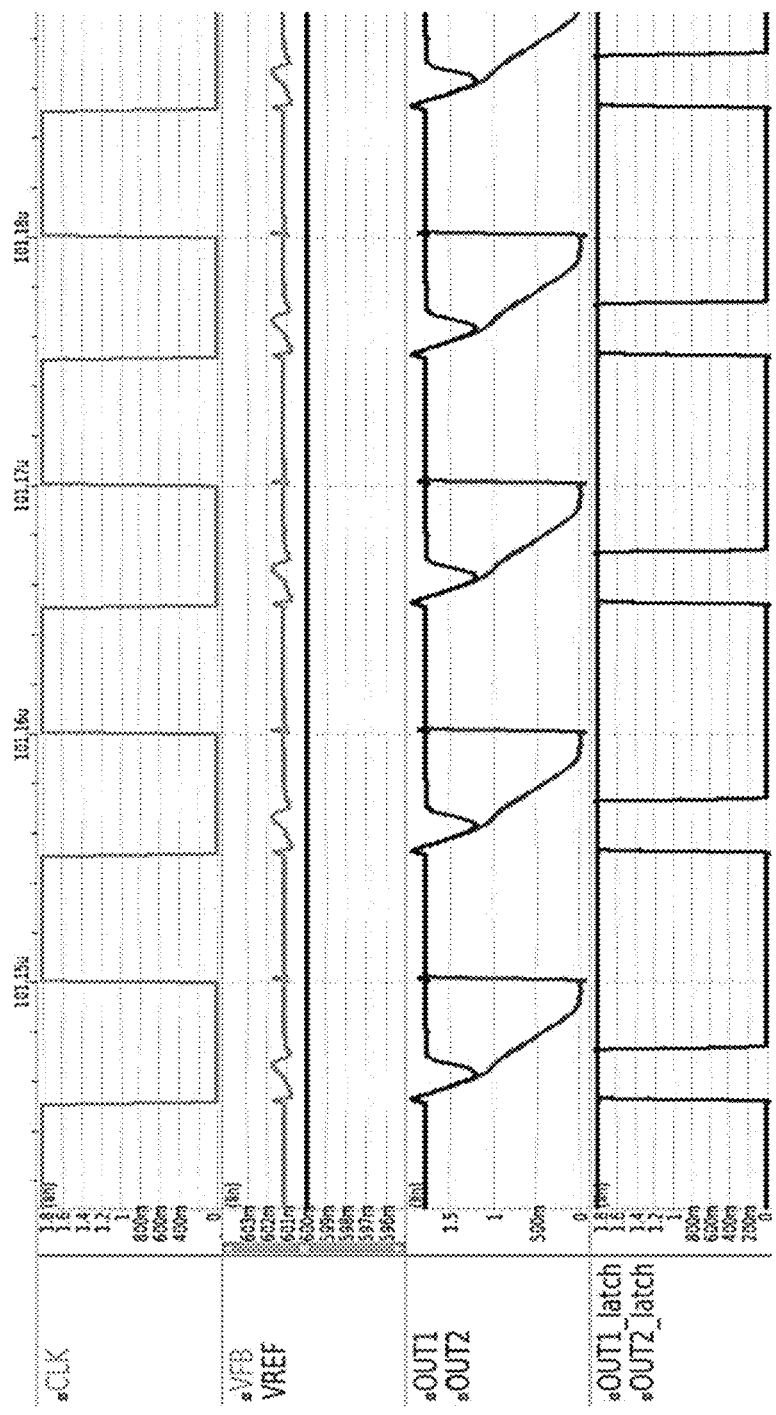
FIG. 1B depicts waveforms corresponding to operation of the conventional dynamic comparator of FIG. 1A.
Figure 1C:
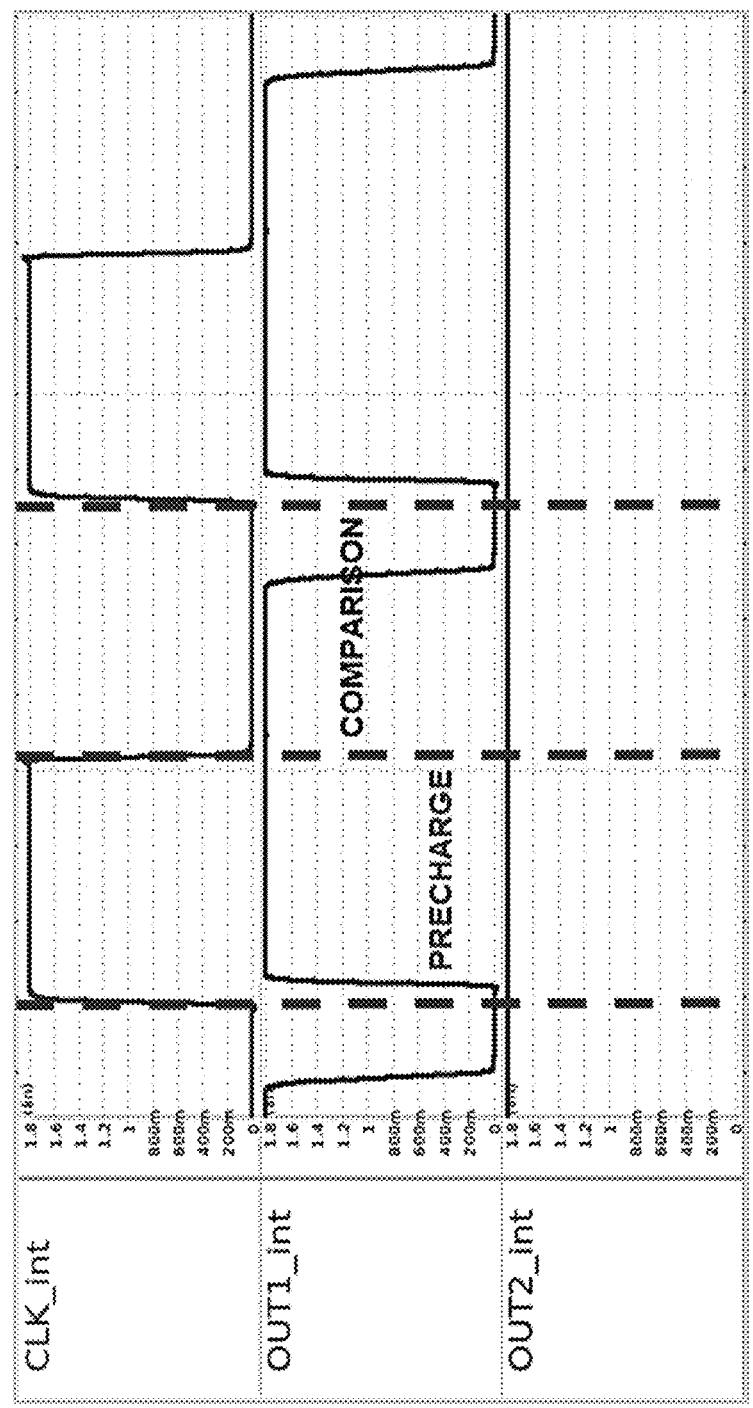
FIG. 1C depicts example waveforms of operation of the dynamic comparator of FIG. 1A in a scenario where the dynamic comparator works without failure in a comparison phase.
Figure 1D:
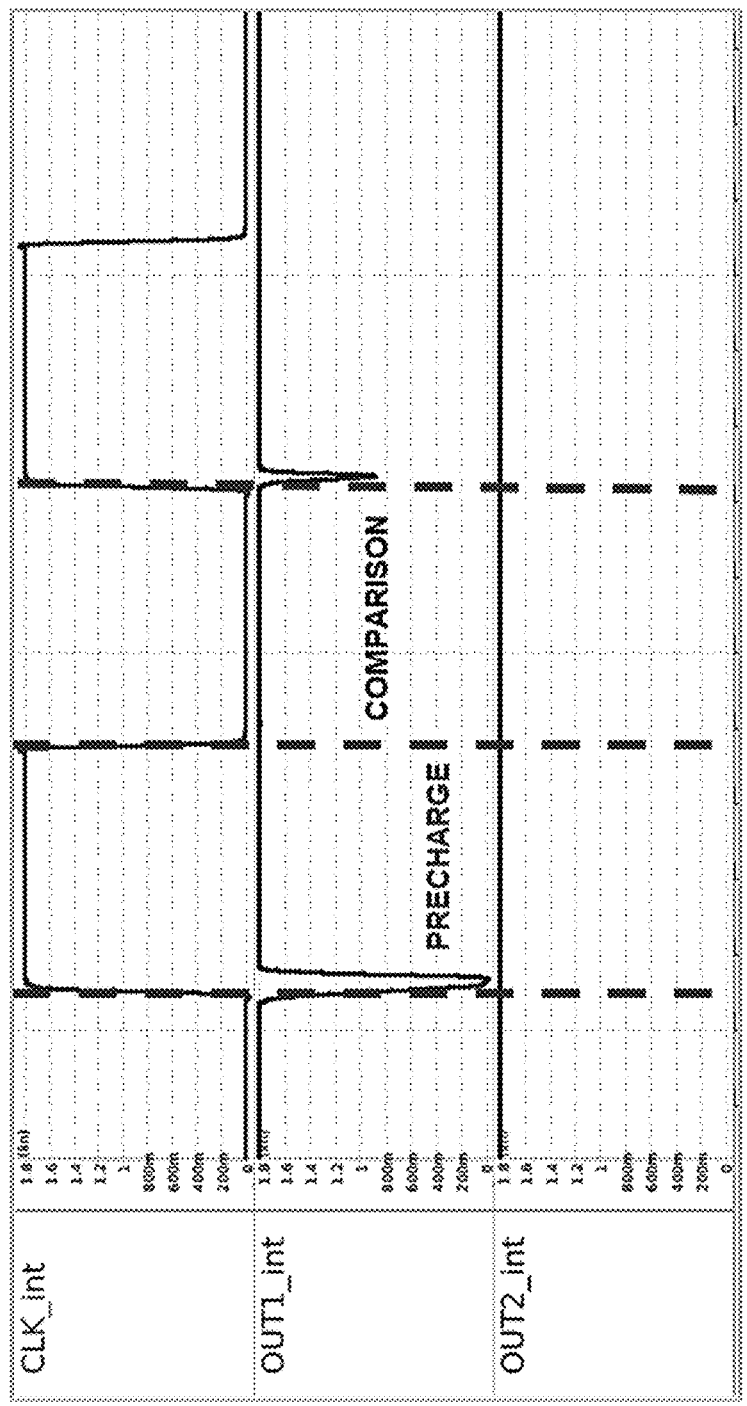
FIG. 1D depicts waveforms of operation of the dynamic comparator of FIG. 1A in a scenario where the dynamic comparator fails in the comparison phase.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example embodiments herein achieve an adaptive control of clock speeds fed to dynamic comparators by integrating a clock speed control circuit to avoid failures in dynamic comparators which are driven at high clock speeds. Referring now to the drawings, and more particularly to FIGS. 2 through 6, where similar reference characters denote corresponding features consistently throughout the figures, there are shown various embodiments.

Figure 2:
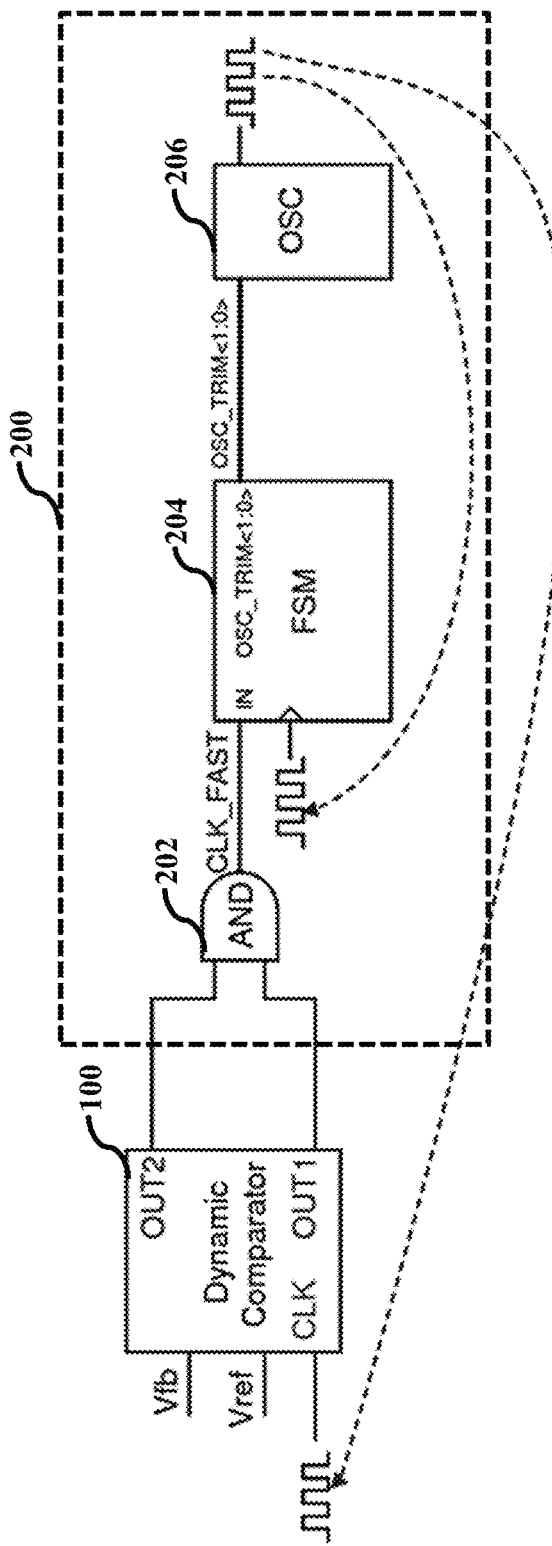
FIG. 2 depicts a clock speed control circuit for a dynamic comparator, according to embodiments as disclosed herein.

FIG. 2 depicts a clock speed control circuit 200 for a dynamic comparator 100. The clock speed control circuit 200 is connected to the dynamic comparator 100. The clock speed control circuit 200 comprises an AND gate 202, a Finite State Machine (FSM) 204, and an oscillator (OSC) 206. For example, the dynamic comparator 100 can be provided with a clock CLK input and two output voltages, OUT1 and OUT2.

In an embodiment herein, the AND gate 202 is connected to the outputs OUT1 and OUT2 of the dynamic comparator 100. For example, the outputs OUT1 and OUT2 are both input to the AND gate 202. The AND gate 202 can determine at least one failure in the dynamic comparator 100 by sensing the outputs OUT1 and OUT2 for an operating speed. The AND gate 202 can determine the failure (e.g., can output a result that indicates a failure) when the operating speed of the dynamic comparator 100 is slow. For example, the AND gate 202 can determine the operating speed as slow (e.g., can output a result that indicates a slow operating speed of the dynamic comparator 100) when both of the outputs OUT1 and OUT2 of the dynamic comparator 100 remain at a pre-charged value at the end of a comparison phase. The slow speed may be a speed slower than a threshold speed needed for the dynamic comparator 100 to operate properly.

For example, the dynamic comparator 100 works in two phases i.e., a pre-charge phase and the comparison phase. During a positive clock level trigger (e.g., during a positive clock level period starting at a rising edge of the clock signal and continuing while the clock signal remains high), the dynamic comparator 100 works in the pre-charge phase where the outputs OUT1 and OUT2 may remain the same. However, during a negative clock level trigger (e.g., during a negative clock level period starting at a falling edge of the clock signal and continuing while the clock signal remains low), the dynamic comparator 100 works in the comparison phase where the outputs (OUT1 and OUT2) may not be able to toggle at the end of the comparison phase and thus both may remain in a high (e.g., "1") state, which may result in failure. This failure information can be sensed by the AND gate 202 and the AND gate 202 may provide a flag that represents a clock speed indicator "CLK_FAST" indicating whether the failure has occurred in the dynamic comparator 100. The CLK_FAST signal indicates the operating speed of the dynamic comparator 100 as either fast or slow (for example, relatively speaking, where a "fast" indication such as a "1" corresponds to a situation where there is a failure, and a "slow" indication such as a "0" corresponds to a situation where there is no failure).

In an embodiment herein, the FSM 204 can be triggered by the AND gate 202, which may indicate the failure in the dynamic comparator 100. The FSM 204 can generate at least one control signal for controlling a clock speed of the dynamic comparator 100, based on the received CLK_FAST signal from the AND gate 202. The FSM 204 may change a time-period state (e.g., a period, or cycle length) of a clock signal and then generate the control signal based on the change of the time-period state. The FSM 204 may be designed with a logical entity to sequentially perform the controlling operations in a finite set of operating stages i.e., states.

In an embodiment herein, the OSC 206 can be configured for trimming a frequency of the clock signal for controlling the clock speed of the dynamic comparator 100, based on the generated control signal received from the FSM 204. The OSC 206 drives the clock signals with a trimmed frequency to the dynamic comparator 100. The OSC 206 trims the frequency of the clock signal for increasing the clock time period according to the operating speed of the dynamic comparator 100.

Figure 3:
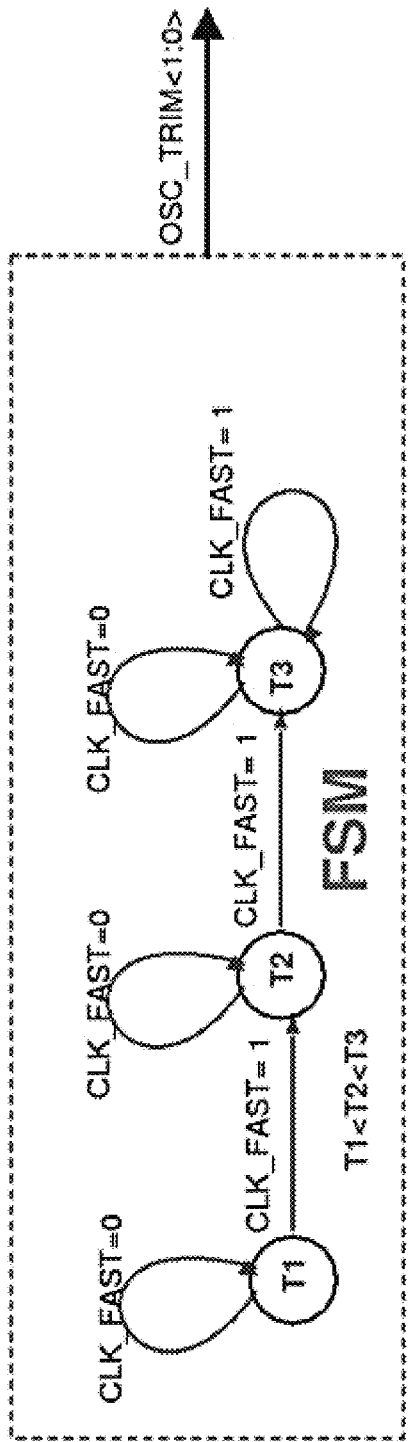
FIG. 3 depicts a detailed schematic view of an FSM function, according to embodiments as disclosed herein.

FIG. 3 depicts a detailed schematic view of the FSM 204 function. After receiving a flag from the AND gate 202, the FSM 204 changes its state or retains its state depending on the flag. The FSM 204 provides control signals to the OSC 206 depending on its state. The OSC 206 in turn controls the time period of the clock CLK.

For example, if the CLK_FAST signal is "0" in the time-period T1 state, then the FSM 204 determines that there is no failure in the comparison phase of the dynamic comparator 100 and thereby maintains its state. If the dynamic comparator 100 is not fast enough, then the CLK_FAST signal goes HIGH (i.e., "1") and the FSM 204 changes its state to next time-period T2. In the T2 state, the OSC 206 trims the frequency of the CLK signals (e.g., decreases the frequency) where the frequency of the OSC 206 is slowed down (i.e., T1<T2) to drive the CLK signals to the dynamic comparator 100. If the dynamic comparator 100 is still not fast enough, then the CLK_FAST signal goes HIGH (i.e., "1") and the FSM 204 changes its state to the next time-period T3 and trims the OSC 206 frequency accordingly. Therefore, the cycle continues to trim the frequency of the CLK signals, until the CLK fast signal from the AND gate 202 is low i.e., "0".

Figure 4:
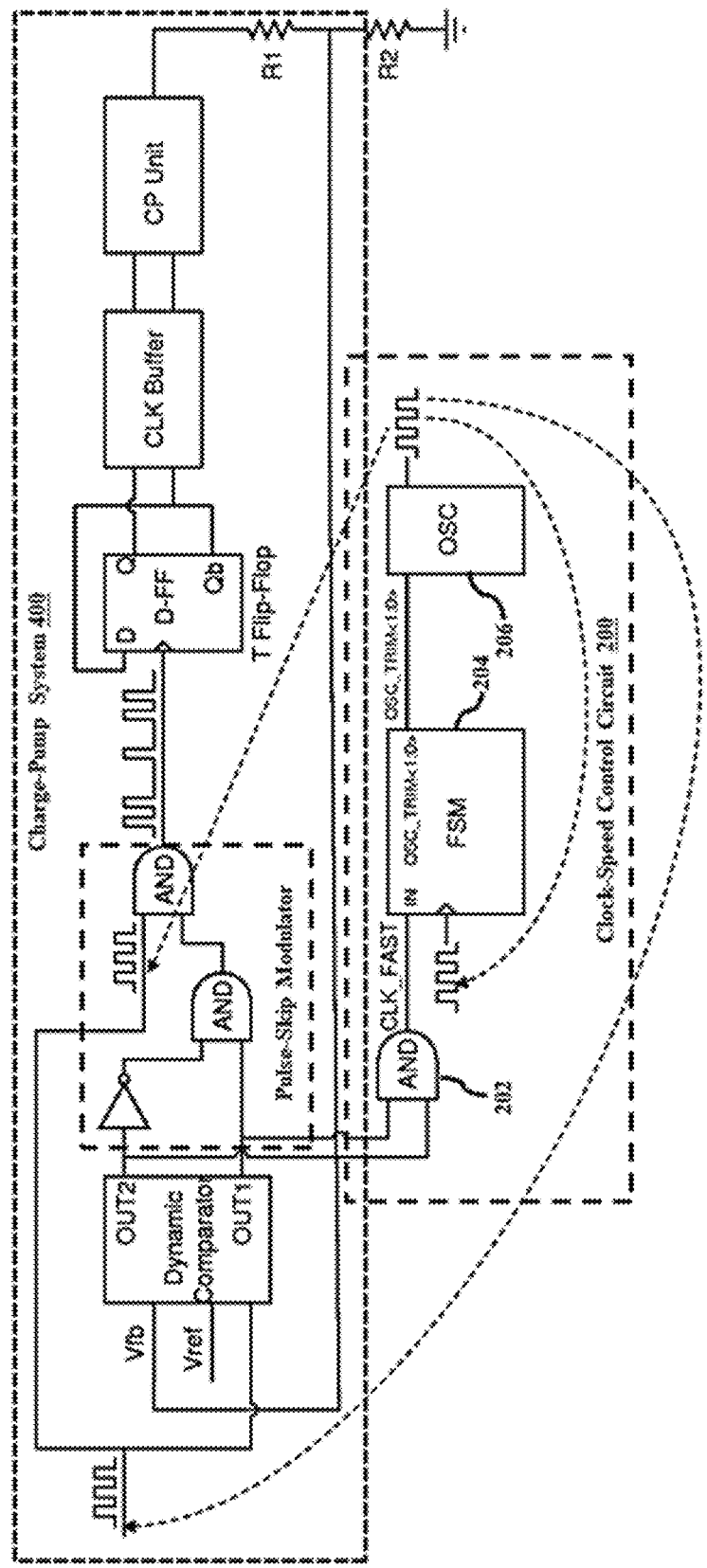
FIG. 4 depicts the clock speed control circuit integrated with the dynamic comparator of a charge-pump system, according to embodiments as disclosed herein.

FIG. 4 depicts the clock speed control circuit 200 integrated with the dynamic comparator 100 of a charge-pump system 400. The charge-pump system 400 or other systems (which employ a dynamic comparator 100) can integrate the proposed clock speed control circuit 200 for controlling the clock speeds fed to the dynamic comparator 100, hereby obtaining output without failures.

Figure 5:
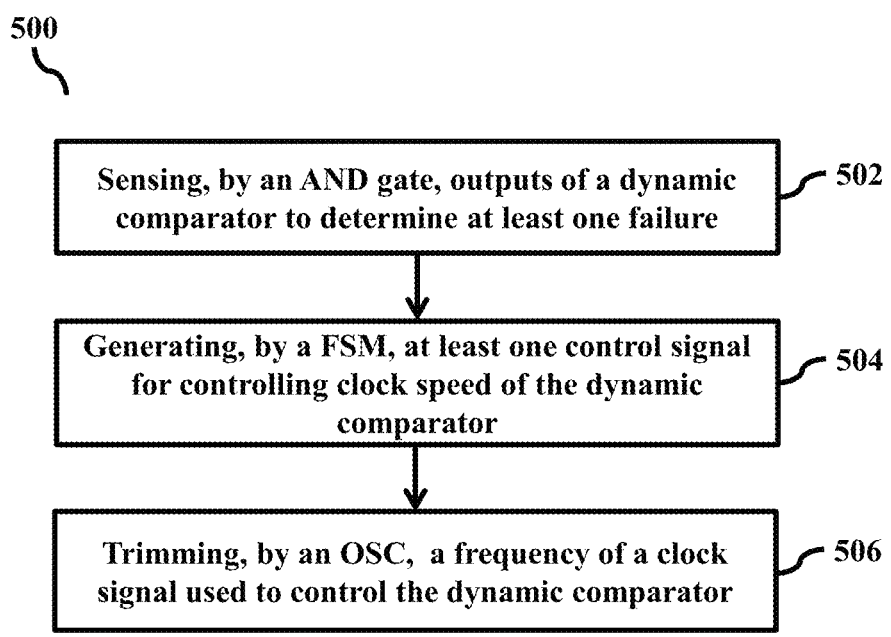
FIG. 5 depicts a method of controlling a clock speed of the dynamic comparator using the clock speed control circuit, according to embodiments as disclosed herein.

FIG. 5 depicts a method 500 to control a clock speed of the dynamic comparator 100 using the clock speed control circuit 200. The method 500 includes sensing, by an AND gate 202, outputs of the dynamic comparator 100 for determining at least one failure in the dynamic comparator 100, as depicted in step 502. The sensing may include, for example, receiving as inputs the outputs of the dynamic comparator 100. The failure is determined when an operating speed of the dynamic comparator is slow. The AND gate 202 determines the operating speed as slow when the output of the dynamic comparator remains at a pre-charged value at the end of the comparison phase, for example resulting in an output of "1" from the AND gate 202.

The method 500 includes generating, by the FSM 204, at least one control signal for controlling the clock speed of the dynamic comparator 100, as depicted in step 504, based on the determined failure. The method 500 includes trimming (e.g., reducing), by the OSC 206, a frequency of a clock signal for controlling the clock speed of the dynamic comparator 100, as depicted in step 506, based on the control signal received from the FSM 204. The FSM 204 may generally be referred to as a clock speed control circuit.

The various actions in method 500 may be performed in the order presented, in a different order or simultaneously. Further, in some embodiments, some actions listed in FIG. 5 may be omitted.

Figure 6:
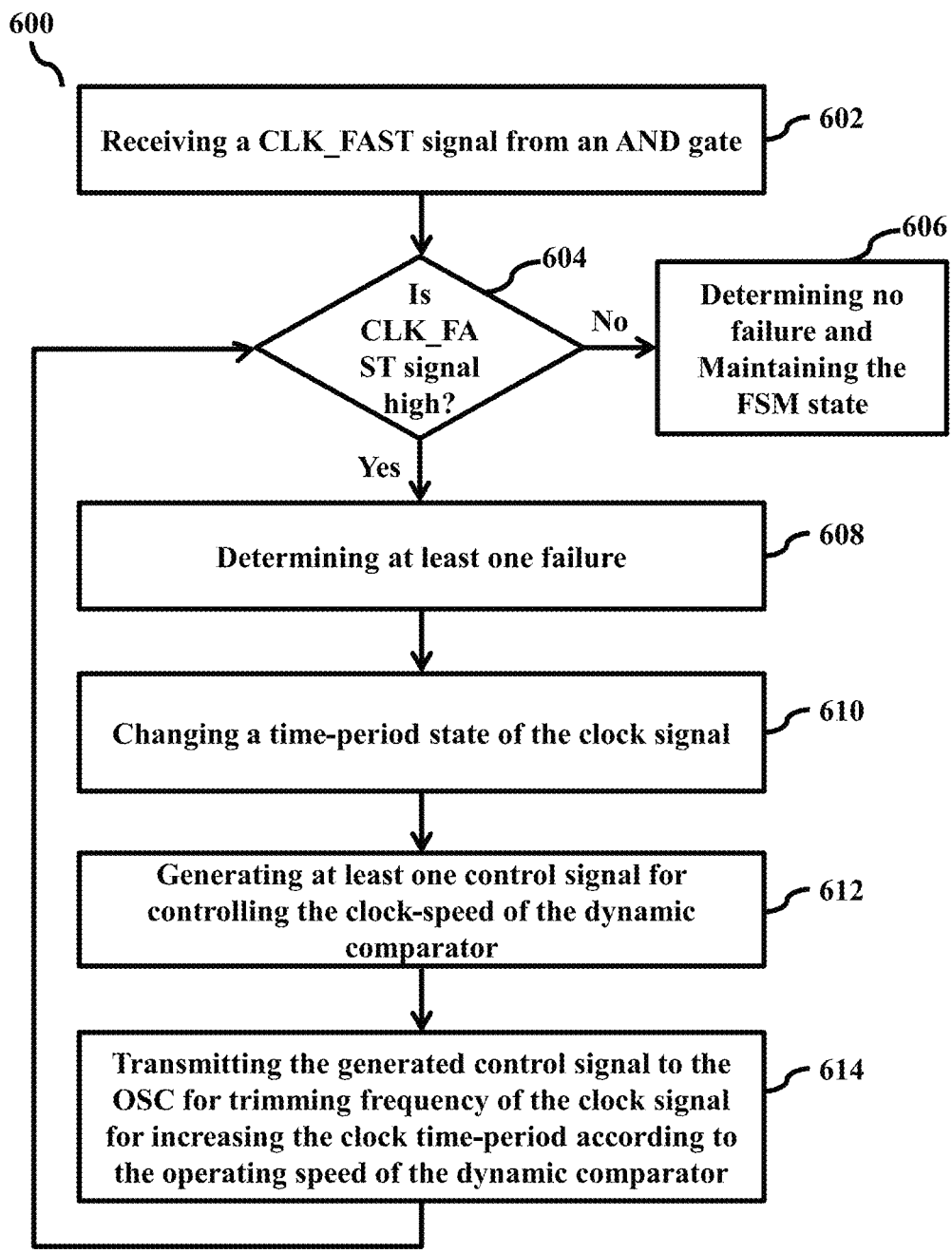
FIG. 6 depicts a detailed method of controlling a clock speed of the dynamic comparator using the FSM of the clock speed control circuit, according to embodiments as disclosed herein.

FIG. 6 depicts a detailed method 600 to control a clock speed of the dynamic comparator 100 using the FSM 204 of the clock speed control circuit 200. The method 600 includes receiving a clock speed indicator (e.g., CLK_FAST signal from the AND gate 202, as depicted in step 602. The method 600 includes verifying whether the received CLK_FAST signal is HIGH, as depicted in step 604.

The method 600 includes determining no failure in the comparison phase of the dynamic comparator 100 and maintaining the FSM 204 state, as depicted in step 606, if the CLK_FAST signal is LOW or "0". The method 600 includes determining at least one failure, as depicted in step 608, if the CLK-FAST signal is HIGH or "1". The method 600 includes changing a time-period state of the clock signal, as depicted in step 610. The method 600 includes generating at least one control signal for controlling the clock speed of the dynamic comparator 100, as depicted in step 612, in the changed time-period state of the clock signal. The method 600 includes transmitting the generated control signal to the OSC 206 for trimming frequency of the clock signal, as depicted in step 614, for increasing the clock time period according to the operating speed of the dynamic comparator 100. Later, the cycle repeats from step 604 where the CLK fast signal is verified.

The various actions in method 600 may be performed in the order presented, in a different order or simultaneously. Further, in some embodiments, some actions listed in FIG. 6 may be omitted.

The proposed clock speed control circuit 200 can be applicable to different clock based comparators.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

What is claimed is:

1. A method of controlling a clock speed of a dynamic comparator, comprising:
   sensing, by a clock speed control circuit, an output of the dynamic comparator to determine at least one failure in the dynamic comparator; and
   reducing, by the clock speed control circuit, a frequency of a clock signal used to control the dynamic comparator, based on the determined at least one failure in the dynamic comparator.

2. The method as claimed in claim 1, further comprising determining the at least one failure when an operating speed of the dynamic comparator is slower than a threshold speed.

3. The method as claimed in claim 2, further comprising determining, by an AND gate of the clock speed control circuit, the operating speed as slower than the threshold speed when all outputs of the dynamic comparator remain at a pre-charged value in a comparison phase.

4. The method as claimed in claim 3, further comprising:
   receiving, by a Finite State Machine (FSM) of the clock speed control circuit, an output from the AND gate;
   changing, by the FSM of the clock speed control circuit, a time-period state of the clock signal, when the received operating speed is slower than the threshold speed; and
   generating, by the FSM of the clock speed control circuit, at least one control signal for controlling the clock speed of the dynamic comparator, based on the change of the time-period state of the clock signal.

5. The method as claimed in claim 4, further comprising:
receiving, by an oscillator (OSC) of the clock speed control circuit, the generated at least one control signal from the FSM; and
reducing, by the OSC of the clock speed control circuit, the frequency of the clock signal to increase the clock time period according to the operating speed of the dynamic comparator, based on the received at least one control signal.

6. A clock speed control circuit for a dynamic comparator, comprising:
an AND gate configured for sensing an output of the dynamic comparator for determining at least one failure in the dynamic comparator; and
a Finite State Machine (FSM) configured for generating at least one control signal for controlling a clock speed of a clock signal of the dynamic comparator, based on the determined at least one failure in the dynamic comparator.

7. The clock speed control circuit as claimed in claim 6, wherein the AND gate determines the at least one failure when an operating speed of the dynamic comparator is slower than a threshold speed.

8. The clock speed control circuit as claimed in claim 7, wherein the AND gate determines the operating speed as slower than the threshold speed when all outputs of the dynamic comparator remain at a pre-charged value in a comparison phase.

9. The clock speed control circuit as claimed in claim 6, wherein the FSM changes a time-period state of a clock signal and generates the at least one control signal based on the change of the time-period state.

10. The clock speed control circuit as claimed in claim 6, wherein the clock speed control circuit comprises an oscillator (OSC) for reducing a frequency of the clock signal for controlling the dynamic comparator based on the generated at least one control signal.

11. The clock speed control circuit as claimed in claim 10, wherein the OSC reduces the frequency of the clock signal when the operating speed of the dynamic comparator is below a threshold speed.

12. A method of controlling a clock speed of a dynamic comparator, comprising:
receiving, by a clock speed control circuit, an output of the dynamic comparator to determine a failure in the dynamic comparator; and
changing, by the clock speed control circuit, a frequency of a clock signal used to control the dynamic comparator, based on the determined failure in the dynamic comparator.

13. The method as claimed in claim 12, further comprising determining the failure based on an operating speed of the dynamic comparator being slower than a threshold speed.

14. The method as claimed in claim 13, further comprising determining, by an AND gate of the clock speed control circuit, the operating speed as slower than the threshold speed when all outputs of the dynamic comparator remain at a pre-charged value in a comparison phase.

15. The method as claimed in claim 14, further comprising:
receiving, by a Finite State Machine (FSM) of the clock speed control circuit, an output from the AND gate;
changing, by the FSM of the clock speed control circuit, a time-period state of the clock signal, when the received operating speed is slower than the threshold speed; and
generating, by the FSM of the clock speed control circuit, at least one control signal for controlling the clock speed of the dynamic comparator, based on the change of the time-period state of the clock signal.

16. The method as claimed in claim 15, further comprising:
receiving, by an oscillator (OSC) of the clock speed control circuit, the generated at least one control signal from the FSM; and
reducing, by the OSC of the clock speed control circuit, the frequency of the clock signal to increase the clock time period according to the operating speed of the dynamic comparator, based on the received at least one control signal.

* * * * *